(12) United States Patent
Li et al.

(10) Patent No.: US 6,613,389 B2
(45) Date of Patent: Sep. 2, 2003

(54) COATING PROCESS AND COMPOSITION FOR SAME

(75) Inventors: Zhicheng Li, Troy, MI (US); Mark T. Anater, Auburn Hills, MI (US); Gloria S. Hsu, Bloomfield, MI (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/036,122

(22) Filed: Dec. 26, 2001

(65) Prior Publication Data

US 2003/0118739 A1 Jun. 26, 2003

(51) Int. Cl.$^7$ .................................................. B05D 7/16
(52) U.S. Cl. ..................... 427/388.1; 427/421; 427/426
(58) Field of Search .............................. 427/388.1, 421, 427/426

(56) References Cited

U.S. PATENT DOCUMENTS

| | | |
|---|---|---|
| 4,267,299 A | 5/1981 | Oechsle, III |
| 4,442,146 A | 4/1984 | Holubka |
| 4,576,868 A | 3/1986 | Poth et al. |
| 4,616,043 A | 10/1986 | Smith |
| 4,687,830 A | 8/1987 | Weber et al. |
| 4,695,618 A | 9/1987 | Mowrer |
| 5,059,672 A | 10/1991 | Engebretson |
| 5,079,325 A | 1/1992 | Kano et al. |
| 5,126,170 A | 6/1992 | Zwiener et al. |
| 5,171,818 A | 12/1992 | Wilson |
| 5,189,075 A | 2/1993 | Zimmerman et al. |
| 5,236,741 A | 8/1993 | Zwiener et al. |
| 5,243,012 A | 9/1993 | Wicks et al. |
| 5,250,650 A | 10/1993 | Boretzky et al. |
| 5,480,955 A | 1/1996 | Primeaux, II |
| 5,504,181 A | 4/1996 | Primeaux, II |
| 5,616,677 A | 4/1997 | Primeaux, II et al. |
| 5,648,173 A | 7/1997 | Blizzard |
| 5,656,677 A | 8/1997 | Jourquin et al. |
| 5,661,216 A | 8/1997 | Laginess et al. |
| 5,731,397 A | 3/1998 | Primeaux, II et al. |
| 5,807,924 A | 9/1998 | Becker et al. |
| 5,814,398 A | 9/1998 | Kronz et al. |
| 6,013,755 A | 1/2000 | Primeaux, II et al. |
| 6,180,745 B1 * | 1/2001 | Roesler ................. 528/59 |
| 6,183,870 B1 * | 2/2001 | Hergenrother et al. ... 428/423.1 |
| 6,281,393 B1 | 8/2001 | Molina et al. |
| 6,355,829 B2 * | 3/2002 | Roesler et al. ............. 560/25 |

FOREIGN PATENT DOCUMENTS

| | | | |
|---|---|---|---|
| CA | 2316536 | * | 8/2000 |
| EP | 0 849 298 A1 | | 6/1998 |
| EP | 1081171 | * | 3/2001 |
| FR | 2 749 017 | | 11/1997 |
| JP | 63-178174 | | 7/1988 |
| JP | 64-004276 | | 1/1989 |
| JP | 7-268282 | | 10/1995 |
| JP | 9-221534 | | 8/1997 |

* cited by examiner

*Primary Examiner*—Erma Cameron
(74) *Attorney, Agent, or Firm*—Dobrusin & Thennisch PC

(57) ABSTRACT

There is disclosed a composition for forming a protective coating upon a substrate. The composition has been found particularly useful for forming a protective coating upon components of automotive vehicles, such as a bedliner for a pick-up truck. The composition may include, without limitation, an isocyanate component and an amine component and optionally includes one or more of a catalyst, stabilizer, pigment, fire retardant or other additives.

31 Claims, 1 Drawing Sheet

COATING PROCESS AND COMPOSITION FOR SAME

TECHNICAL FIELD

The present invention relates to a composition useful for forming a protective coating on a substrate and to a process for using the same.

BACKGROUND OF THE INVENTION

Historically, coatings have been applied to substrates, both to protect the substrates and to improve the properties of the substrates. For example, and without limitation, coatings have been developed to protect substrates from various environmental conditions and to protect substrates during contact of the substrates with other objects. Moreover, coatings have been developed to improve properties of substrates such as durability, strength, environmental resistance and the like.

In the automotive industry, coatings are used for protecting various components of an automotive vehicle. As an example, coatings are used for protecting vehicle components against cosmetic damage (e.g., degradation, marring, denting) due to corrosion, abrasions, impacts, chemicals, ultraviolet light, thermal cycling or the like. While, it is desirable for such coatings to protect against cosmetic damage, it is also desirable to provide a composition that is relatively easy to handle, and particularly exhibits relatively low volatile emissions. Thus, the present invention provides a composition for forming a coating with improved protection capabilities, ease of handling and relatively low volatile emissions.

SUMMARY OF THE INVENTION

The present invention meets the above needs and others by providing a composition and process for coating a substrate. The process includes contacting the substrate with a composition including an isocyanate in an amount up to about 75% by volume of the composition, the isocyanate being at least 75% aliphatic by weight; and an amine in an amount up to about 75% by volume of the composition.

DETAILED DESCRIPTION OF THE PREFERRED EMBODIMENT

Figure 1:
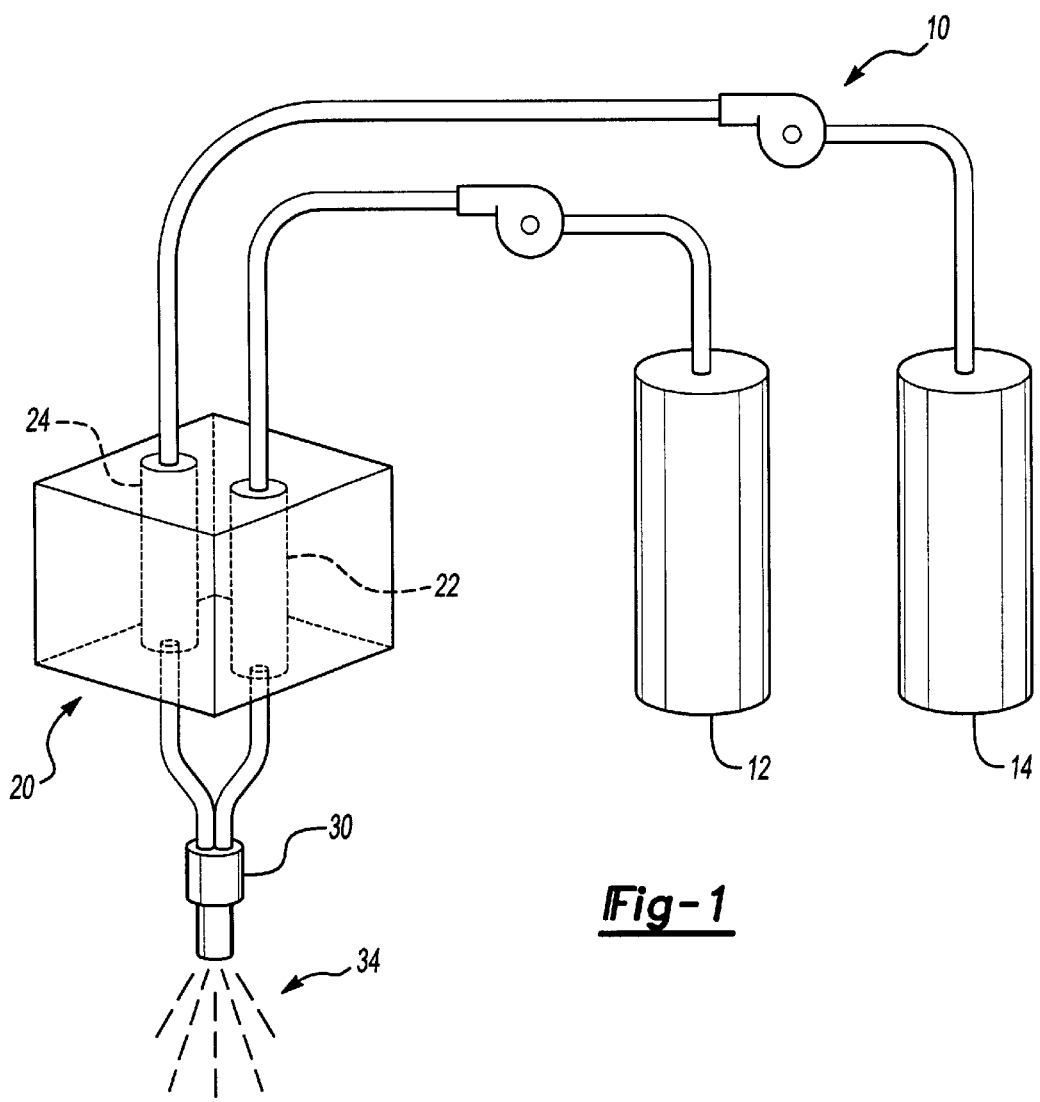
FIG. 1. illustrates a process and apparatus for applying the composition to form a protective coating on a substrate.

The present invention provides a process and composition for forming a protective coating upon a substrate. In a preferred embodiment, the composition forms a protective coating on a substrate provided by one or more components of an automotive vehicle. In a highly preferred embodiment, the composition forms a protective coating on a surface of a pick-up truck bed, and thus forms a bed-liner for such pick-up truck.

The composition preferably includes at least two components:
1) an isocyanate component; and
2) an amine component.

The isocyanate component in the composition may include a single isocyanate or a mixture of two or more different isocyanates. Amounts of isocyanate present in the composition may range up to about 75% by volume, and more preferably range from about 30% to about 70% by volume. Even more preferably, the isocyanate is present in the composition from about 40% to about 60% by volume and most preferably from about 45% to about 55% by volume.

Preferred isocyanates of the present composition may be monoisocyanates, diisocyanates, polyisocyanates or a combination thereof. Included in the definition of isocyanates are the isocyanates themselves, or optionally dimers, trimers, prepolymers or quasi-prepolymers thereof with active-hydrogen components (e.g., obtainable from use of a polyol, amine-terminated polyether, or otherwise).

Exemplary monoisocyanates include, without limitation, isophorone monoisocyanate, 3,5-dimethylphenyl isocyanate, paratoluenesulfonyl monoisocyanate.

Representative examples of diisocyanates include, without limitation, 4,4'-diisocyanatodiphenylmethane, p-phenylene diisocyanate, 1,3-bis(isocyanatomethyl)-cyclohexane, 1,4-diisocyanatocyclohexane, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred examples include 4,4'-diisocyanatodicyclohexylmethane and 4,4'-diisocyanatodiphenylmethane, 4,4'-diisocyanatodiphenylmethane. Other potential isocyanates include, without limitation, triisocyanates such as toluene-2,4,6-triisocyanate and isocyanates such as 4,4'-dimethyldiphenylmethane-2,2',5'5'-tetraisocyanate and the diverse polymethylene polyphenyl polyisocyanates.

Isocyanates of the present invention may be aromatic or aliphatic (e.g., cycloaliphatic). It is preferred, however, that the major portion of the isocyanate composition is aliphatic. In one preferred embodiment, at least 75% of the isocyanate is aliphatic by weight, more preferably at least 90% of the isocyanate is aliphatic by weight and even more preferably at least 99% of the isocyanate is aliphatic by weight.

In one embodiment, preferably, the isocyanate has an NCO equivalent weight of at least about 130, more preferably at least about 160, and most preferably at least about 200; and is preferably no greater than about 500, more preferably no greater than about 400, and most preferably no greater than about 300. Moreover, It is desirable for the isocyanate to have a relatively low residual monomer level that is preferably less than about 1% by weight, more preferably less than about 0.2% by weight and most preferably less than about 0.05% by weight. Such low residual monomer level can assist in lowering volatile emission levels while handling the unreacted component or during application of the composition.

In a highly preferred embodiment, the isocyanate includes a liquid aliphatic isocyanate oligomer or prepolymer based upon dicyclohexylmethane 4,4'-diisocyanate ($H_{12}MDI$), isophorone diisocyanate (IPDI), tetramethyl-1,3-xylylene diisocyanate (TMXDI), hexamethylene diisocyanate (HDI) or a mixture thereof.

One highly preferred isocyanate is a dimerized, trimerized or the biureted form of hexamethylene diisocyanate (HDI) or its quasi-prepolymer. An example of such a composition is DESMODUR XP-7100, which is commercially available from Bayer Corporation, Pittsburgh, Pa.

The amine is present in the composition for reacting with the isocyanate component of the composition, and preferably forming a urea linkage. By "amine component" herein, it is meant a component having an amine functional group, such as molecules, compounds, oligomers, polymers, or the like having an amine termination or active hydrogens that are amine hydrogens. The amount of amine may be any suitable amount for achieving the desired amount of urea. For instance, the amine may be present in the composition in an amount up to about 75% by volume and more preferably from about 30% to about 70% by volume. Even more preferably, the amine is present in the composition from about 40% to about 60% by volume and even more preferably from about 45% to about 55% by volume.

Amines suitable for the composition of the present invention may be primary, secondary, tertiary amines or mixtures thereof. The amines may by monoamines, diamines, triamines or mixtures thereof. The amines may be aromatic or aliphatic (e.g., cycloaliphatic), but are preferably aliphatic. The amine preferably is provided as a liquid having a relatively low viscosity (e.g., less than about 100 mPa·s at 25° C.). Particularly preferred resins of the composition are primarily based upon secondary amines or mixtures of primary and secondary amines. For example, if a mixture of primary and secondary amines is employed, preferably the primary amine is present in an amount up to about 50 parts by volume, with the secondary amine present in an amount up to about 100 parts by volume. Though others can be used, primary amines present is the resin preferably have a molecular weight greater than about 200 (e.g., for reduced volatility), and secondary amines present in the resin are preferably diamines with molecular weights of at least about 190 (e.g., about 210–230).

In one preferred embodiment, the amine is a resin that includes at least one secondary amine at the amount of 20% to 100%, preferably 40% to 80%, and more preferably about 50% to 70% by volume. Suitable secondary amines include mono-functional acrylate or methacrylate modified aliphatic polyamines. Examples of the aliphatic polyamines includes, without limitation, ethylamine, the isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

An example of a particularly preferred amine includes an aliphatic amine, such as a cycloaliphatic polyamine with high steric hindrance that is optionally modified with an n-butyl group. One such amine is available commercially from UOP under the designation of CLEARLINK™. Another example of a particularly preferred amine is an acrylic modified primary amine.

In another highly preferred embodiment, the amine is provided as an amine-functional resin. More preferably, such amine-functional resin is a relatively low viscosity, amine-functional resin suitable for use in the formulation of high solids polyurethane/polyurea coatings. One highly preferred amine-functional resin is substantially free of solvent. Though any of a number of different resins may be suitable, a preferred resin is an ester of an organic acid. For example, one highly preferred amine is an aspartic ester-based amine-functional reactive resin that is compatible with isocyanates (e.g., one that is solvent free, and/or has a mole ratio of amine functionality to the ester of no more than 1:1 so there remains no excess primary amine upon reaction), such as DESMOPHEN NH 1220 commercially available from Bayer Corporation, Pittsburgh, Pa. Of course, other suitable compounds containing aspartate groups may be employed as well. Other examples of particularly preferred secondary polyamines are polyaspartic esters, which are derivatives of compounds such as maleic acid, fumaric acid esters, aliphatic polyamines and the like.

Such compounds may be prepared in any suitable art-disclosed manner. By way of example, without limitation, the subject matter described in U.S. Pat. No. 5,126,170, 5,236,741 or both, hereby incorporated by reference, may be employed as guidance. For instance primary monoamines or polyamines may be reacted with substituted or unsubstituted maleic or fumaric acid esters.

Without limitation, examples of substituted or unsubstituted maleic or fumaric acid esters suitable for preparing the aspartic esters include dimethyl, diethyl and di-n-butyl esters of maleic acid and fumaric acid, mixtures of maleates and fumarates, and the corresponding maleic acid esters, fumaric acid esters, or mixtures thereof, substituted by methyl in the 2-position, 3-position or both.

Examples of suitable amines for preparing the aspartic esters include without limitation ethylamine, the isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

One example of the polyaspartic esters is the derivative of diethyl maleate and 1,5-diamino-2-methylpentane, available commercially from Bayer Coporation, Pittsburgh, Pa. under the trade name Desmophen NH1220.

Another group of preferred polyaspartic esters are derivatives of dialkyl maleate or furmarate and cycloaliphatic polyamines with the chemical structure of R-$(CH_2-NH_2)_n$ where, n>=2, and R represents an organic group which is inert towards isocyanate groups at a temperature of 100°C. or less, and contains at least one cycloaliphatic ring. An example, without limitation, is 1,3- or 1,4-bis-aminomethyl cyclohexane, or the mixture thereof.

The amine resin component may also include high molecular weight primary amines, such as polyoxyalkyleneamines at the amount of 0 to 50%, preferably 10% to 40%, and more preferably 20% to 30%. The polyoxyalkyleneamines contain two or more primary amino groups attached to a backbone, such as propylene oxide, ethylene oxide, or a mixture thereof. Examples of such amines include those offered under the designation JEFFAMINE™ from Huntsman Corporation, preferably with a molecular weight ranging from about 200 to about 7500, such as, without limitation, JEFFAMINES D-230, D-400, D-2000, T-403 and T-5000.

Other suitable ingredients, such as isocyanates, amines or amine functional resins suitable for use in the present invention include those disclosed in U.S. Pat. Nos. 5,236,741; 5,243,012; 6,013,755; and 6,180,745, all of which are hereby incorporated by reference for all purposes.

It should be recognized that concentrates or diluted forms of the present composition may be employed, pursuant to which the proportion of the amine to isocyanate assumes a proportion corresponding with the above volume percentages. Thus, for example, in one embodiment, the amine and the isocyanate are present in an amount of about 1:10 to about 10:1 parts by volume, and more preferably about 1:3 to about 3:1 parts by volume, and still more preferably about 1:1 parts by volume. For example, a highly preferred proportion is about 1.3:1 parts by volume of amine to isocyanate.

In addition to amine and isocyanate, the composition may include one or more additional ingredients for functioning as a catalyst, stabilizer, pigment, fire retardant or other performance or property modifier. Preferably, and as described below, any such additives are provided as part of the amine-based resin prior to combination of the resin with the isocyanate. However, it is contemplated that various ingredients of the composition may be combined with the isocyanate prior to combining the remaining ingredients.

In a highly preferred embodiment, the present composition employs no catalyst. However, in certain embodiments, it is possible that one or more art-disclosed catalysts may be provided in the composition as desired. Examples include conventional polyurethane catalysts, such as organometallic catalysts (e.g., stannous compounds).

One or more stabilizers may be provided in the composition. Preferably, the resin includes an ultraviolet (UV) light absorber and a visible light absorber for assisting coatings formed by the composition in resisting degradation caused by exposure to sunlight. Light absorber is preferably present in the resin from about 0% to about 10% by weight more preferably from about 1 % to about 7% by weight and even more preferably from about 2% to about 4% by weight.

Exemplary light stabilizers include, without limitation, hindered phenols, aromatic amines, organophosphites, thioesters and the like. In a highly preferred embodiment, the resin includes about 2% by weight of a hindered amine light stabilizer such as TINUVIN 292 commercially available from Ciba Specialty Chemicals and about 1% by weight of a hindered amine UV stabilizer such as TINUVIN 1130 also commercially available from Ciba Specialty Chemicals.

The composition also may preferably include a thermal stabilizer for assisting the coatings formed by the composition in resisting degradation caused by exposure to thermal cycling. Thermal stabilizer is preferably present in the resin from about 0% to about 10% by weight more preferably from about 0.33% to about 2% by weight and even more preferably from about 0.66% to about 1.33% by weight.

Exemplary light stabilizers include, without limitation, hindered phenols, aromatic amines, organophosphites, thioesters and the like. Preferably, the thermal stabilizer in the composition is an antioxidant. One highly preferred antioxidant is a phenolic antioxidant such as octadecyl 3,5-di-(tert)-butyl4-hydroxyhydrocinnamate sold under the tradename IRGANOX 1076 and commercially available form Ciba Specialty Chemicals.

One or more fire retardants may also be provided in the composition. Fire retardant is preferably present in the resin from about 0% to about 10% by weight more preferably from about 1% to about 7% by weight and more preferably from about 2% to about 4% by weight.

Exemplary fire retardants include, without limitation, powdered or fumed silica, layered silicates, aluminum hydroxide, brominated fire retardants, tris(2-chloroethyl) phosphate, tris(2-chloropropyl)phosphate, tris(2,3-dibromopropyl)phosphate, tris(1,3-dichloropropyl) phosphate, diammonium phosphate, various halogenated aromatic compounds, antimony oxide, alumina trihydrate, polyvinyl chloride, and the like, and combinations thereof.

Furthermore, one or more pigments may be provided in the composition. Pigment is preferably present in the resin from about 0% to about 20% by weight more preferably from about 3% to about 15% by weight and more preferably from about 6% to about 8% by weight. In a highly preferred embodiment, the resin includes a titanium dioxide pigment such as TRONOX 6001 commercially available from the Kerr-McGee Corporation.

The resin may also include components for controlling static such as about 2% to 5% by weight of a conductive carbon black, KETJENBLACK EC-300J commercially available from Ketjenblack International Corporation, a joint venture of Ferro-Plast and Akzo Nobel Chemicals. A highly preferred static controlling agent is a metal salt, such as a potassium salt (e.g. potassium hexafluorophosphate), which may be provided in an amount up to about 0.4% by weight of the resin. In a highly preferred embodiment, a potassium salt is dissolved in a propylene glycol with amine functionality and thereafter mixed in the resin.

To prevent sagging of the uncured coating of composition on, for example, a vertical surface, the composition may also include a thixotropic agent (thickener) in an amount of about 0 to 10%, preferably about 1% to 8%, and more preferably about 2% to 4%. The thixotropic agent may also help in preventing the phase separation of pigments and other solids from the liquid chemicals during storage, transportation and application. Examples of thixotropic agents include, without limitation, fumed silica, such as CAB-O-SIL TS-720 and CAB-O-SIL PTG commercially available from Cabot Corp., bentonite clay or the like. The agent may be liquid or solid, or a combination thereof.

The composition may also include other additives such as fillers or even fibrous reinforcement (e.g., for forming a composite).

The various ingredients of composition may be combined and applied to a substrate according to a variety of combination and application protocols to form protective coatings. Preferably, the isocyanate is separated from the amine until a short period of time (e.g., preferably less than about 5 minutes, more preferably less than about 60 seconds and most preferably less than about 10 seconds) prior to application of the composition to a substrate. The composition may be applied to a surface of a substrate using suitable art-disclosed techniques, including but not limited to brushing, rolling, dipping, dripping, extruding, curtain coating, swabbing, spraying or the like. Moreover, the composition may be applied continuously or intermittently upon a surface of a substrate.

Nearly any substrate may receive the composition to form a coating thereon. The composition may be applied to metal, plastic, or composite substrates, wood substrates or the like. In preferred embodiments, the composition is applied to coated or uncoated surfaces of metal components. In highly preferred embodiments, the composition is applied to painted or e-coated surfaces of automotive components (e.g., to form a truck bedliner, by coating one or more of the floor, side walls, head board, tail gate or other component of a pick-up truck cargo box) and may be applied in addition to or as a replacement for a clear coat. Depending on the desired texture of the coating, the composition may be applied to achieve a smooth surface (e.g., a class A finish) or a roughened or even coarse surface over part or all of the surface.

In certain embodiments, the coated or uncoated surface of a substrate may be treated prior to application of the composition. The surface of a substrate, may be sanded, scuffed, primed or otherwise treated prior to application of the composition to the substrate. For example, it may be desirable to apply a suitable adhesion promoter or primer to the surface to be coated. An example of one such primer is available commercially from The Dow Chemical Company under the name BETAGUARD™ 67725. Advantageously, such pre-treatment techniques can assist the coating formed on the substrate to tenaciously adhere to the surface of the substrate. In a highly preferred embodiment, the substrate is pre-treated with a plasma, for example, for ionizing oxygen ($O_2$) molecules that are then directed toward the surface of the substrate. In this manner, the plasma treatment forms suitable groups (e.g., ketone or hydroxyl groups) that bond with the composition such that the composition forms a coating that is even more tenaciously adhered to the surface of the substrate. Of course, other suitable surface treatments may be employed as desired. Examples of various potential surface treatments are described in U.S. Pat. No. 5,298,587; U.S. Pat. No. 5,320,875; U.S. Pat. No. 5,433,786; U.S. Pat. No. 5,494,712 U.S. Pat. No. 5,837,958 incorporated herein by reference.

Thus, it will be appreciated that the application of the coating composition of the present invention will result, in certain preferred embodiments, in forming a laminate of a substrate (e.g., metal (such as steel, magnesium, titanium or aluminum), plastic (such as including a polyurethane, a polystyrene, a polyester, polyolefin, a nylon, an epoxy, an acrylic, or the like), a ceramic, a composite, or otherwise), optionally having a layer from a primer or plasma treatment, optionally having one or more coats (e.g., base coat, top coat, clear coat, such as an art-disclosed 2-component urethane or acrylic coating) thereon, and having the coating composition of the present invention thereon.

According to one preferred protocol, and referring to FIG. 1, there is illustrated a system 10 for combining isocyanate and amine components to form the composition and for applying the composition to a substrate. As shown, the system 10 includes a supply 12 of isocyanate and a supply 14 of amine-based resin. The system 10 also includes a metering system 20 having a first metering container 22 for receiving a predetermined amount of isocyanate and a second metering container 24 for receiving a predetermined amount of resin. Each of the metering containers 22, 24 are in fluid communication with a nozzle 30.

In a preferred approach to applying the composition to a surface, the surface is prepared as desired and provided at a suitable application point. The isocyanate and amine-functional components are delivered to a suitable dispenser. Preferably, the components are independently metered to a mixing chamber, where they are mixed by direct impingement at a controlled ratio, and thereafter released from the dispenser as a mist or fine spray. For example, with reference to FIG. 1, isocyanate and amine components are pumped from their respective supplies 12, 14 to their respective metering containers 22, 24. Thereafter, the isocyanate and amine components in the containers 22, 24 are expelled under pressure from the containers 22, 24 to the nozzle 30 (e.g., which may be part of a gun block) and are expelled from the nozzle 30 as a spray 34. Preferably, the nozzle 30 includes an internal space or cavity (not shown) wherein the isocyanate component and amine component can intermix, atomize or both such that the resulting spray 34 is a substantially homogeneous composition. The pressure used to expel the spray 34 is preferably greater than about 1000 psi and more preferably between about 1500 psi and 2000 psi.

To apply the composition to a substrate, the substrate may be moved relative to the nozzle 30, the nozzle 30 may be moved relative to the substrate or a combination thereof such that the spray 34 is directed at the substrate for layering the composition on the substrate.

It is contemplated that the application system 10 of FIG. 1 may be designed as a robotic system. For example, the nozzle 30, the metering containers 22, 24 or both may be mounted on a robot arm (not show), which may be programmed to move the nozzle 30 as it sprays the composition such that a substrate may be coated as desired. Moreover, such a robotic system could apply coatings upon truck bedliners in an automotive assembly plant or at another location during assembly or formation of a truck. In alternative embodiments, however, the composition may be applied after full assembly of a truck. Advantageously, the composition emits minimal airborne chemicals during application such that spraying systems for applying the composition may be used in a variety of locations.

Although, the composition may be applied at room temperature (e.g., around 20° C.), it may be desirable to heat the isocyanate, the amine or both to no greater than about 90° C. prior to application to improve the mixing efficiency, flow and wetting properties of the composition during application. Once applied, the composition may be allowed to cure upon the substrate to form a protective coating. Curing may occur at a wide variety of temperatures. Generally, curing desirably occurs at room temperature in the absence of applied heat. However, cooling or heating measures may also be taken to lower or raise the temperature of curing.

In preferred embodiments, the rate of curing of the composition may be at least partially chemically controlled. For example, curing of the composition may be controlled by the rate of reaction of the amine component with the isocyanate component. Typically, primary amines react comparatively quickly with the isocyanate while secondary amines react comparatively slowly. Thus, the amine component may be provided as a mixture of primary and secondary amines that are combined according to weight ratios that are chosen as desired to control the rates of curing of the composition to form the coating. Weight ratios of primary amine to secondary amine appropriate for process of application similar to the one described and shown in FIG. 1 are approximately range from about 0:1 to about 0.8:1 and is preferably about 0.5:1.

Preferably, the composition is well mixed into a substantially homogeneous liquid mixture prior to application to a substrate. Thus, upon curing (which may be accomplished substantially without the need to apply heat to the coating), the composition will form a substantially homogeneous coating. The coating may be applied in one or more layers of one or more continuous or variable thickness. Preferred thickness for coatings on automotive components (e.g., for forming a truck bedliner) range from about 0.5 millimeter to about 20 millimeters, more preferably from about 1 millimeter to about 10 millimeters and most preferably from about 3 millimeters to about 5 millimeters. The thickness may vary across a substrate, randomly or according to a predetermined pattern.

In certain embodiments, the protective coatings formed according to the present invention exhibit various advantageous properties. For example, and without limitation, coatings according to the present invention can exhibit strength both adhesive and cohesive up to and greater than 300 psi when applied to painted and e-coated surfaces. Additionally, preferred embodiments of the coating exhibit superior resistance to degradation caused by UV radiation, moisture, thermal cycles, chemical (e.g., alkali) exposure, salt and the like. For example, the coating exhibits substantially no blistering, cracking or charring when sag panel aged for two weeks at about 70° C. Likewise, upon two weeks of water immersion at 32° C., the coating exhibits substantially no blistering, dulling, or softening or loss of adhesion. Like results are also realizable upon exposure to 100% relative humidity at 38° C. for two weeks.

Also advantageously, the coating resists fluid spotting such as from liquid soap, windshield solvent, coolant, motor oil, bug and tar remover or the like. It resists color change, dulling, softening or surface distortion from contact with fuel, as well as from contact with acid or alkali substances.

Table 1 illustrates some additional approximate properties realizable from the coating of the present invention.

TABLE 1

| Taber Abrasion (wt loss, depth) | |
| --- | --- |
| CS10F: | 0.19%, 0.002" |
| H18: | 3.45%, 0.017" |
| Weatherometer Color Retention (ΔL, ΔE) | |
| 500 h: | −1.64, 1.80 |
| 1000 h: | −1.75, 1.46 |
| Shore A Hardness: | 70–90 (more preferably 75–85) |
| Tensile (psi): | 1200–2500 (more preferably 1500–2100) |
| Elongation (%): | 50–300 (more preferably 100–160) |
| Tear (pli): | 200–450 (more preferably 250–350) |
| Vol. Resistivity: | Antistatic |

TABLE 1-continued

| | |
|---|---|
| Static: | Passes standard |
| Flammability: | Self-extinguishes |
| Crocking, dry: | AATCC rating 5 |
| Crocking, dry: | AATCC rating 5 |

Moreover, the coating may desirably exhibit anti-skid properties. Each of the properties discussed make coatings of the present invention desirable for protecting automotive vehicle components and especially as a truck bed liner. In a highly preferred embodiment, the coating composition is employed as original equipment for an automotive vehicle, though it may also be provided for after-market application.

Thus, preferably the vehicle is provided and during the vehicle assembly process or otherwise prior to delivery to an end consumer, the vehicle is contacted with the coating composition of the present invention. The application of the coating may be done prior to the vehicle painting operation, during the painting operation, or after the painting operation. Preferably, application of the coating is performed at the same facility as the painting of the vehicle. However, it is also possible that it is performed at a remote site. The coating may be applied directly to an untreated or bare surface, to a primed surface, to a surface of a galvannealed steel, to painted surface (e.g., with or without a clear coat, or possibly even to a surface coated by overspray in the painting or other finishing operations of the vehicle).

Of course, the coating composition may also be employed in other applications by contacting it with a surface of a substrate, such as that found in or on a storage container, shipping container, rail car, waste container, pallet, or the like. It may also be suitably employed for hard surfaces such as panels, doors, flooring, pavement or the like.

The following examples describe, without limitation, one illustrative composition in accordance with the present invention.

EXAMPLE 1

Table 2 below provides one precise formulation by weight for an exemplary composition in accordance with the present invention. The composition is formed by combining approximately 56.5% by volume of a first component (mixed at ambient temperature), with approximately 43.5% by volume of a second component.

TABLE 2

| Ingredients | Component I (Part by wt.) | Component II (Parts by wt.) |
|---|---|---|
| Oligomer of hexamethylene diisocyanate in solvent | | 100 |
| Amine-functional aspartic acid ester (Desmophen NH 1220) | 86 | |
| Conductive carbon black pigment (Ketjenbalck EC-300J) | 3 | |
| Titanium dioxide filler (Tronox 6001) | 7 | |
| Antioxidant (Irganox 1076) | 1 | |
| Ultraviolet Absorber (Tinuvin 1130) | 2 | |
| Light Absorber (Tinuvin 292) | 1 | |

The components of the composition are sprayed onto a surface of a painted bed of a pick up truck, while maintaining the temperature of the ingredients at or below about 80° C. The coating is allowed to cure in place. The resulting coating exhibits adhesive failure at a stress of greater than 100 psi (as would be measured by stress applied by an Instron tester to a 6.5 cm² button adhered to the coated surface with a 2 part-epoxy resin).

Example 2

Example 1 is repeated except that the coating is applied directly to an unpainted e-coated primed surface of the bed. The resulting coating exhibits cohesive failure at a stress of 400 psi (as would be measured by stress applied by an Instron tester to a 6.5 cm² button adhered to the coated surface with a 2 part-epoxy resin).

It should be understood that the invention is not limited to the exact embodiment or construction, which has been illustrated and described but that various changes may be made without departing from the spirit and scope of the invention.

What is claimed is:

1. A process for coating a surface of an automotive vehicle, comprising:
   a) providing a surface of an automotive vehicle;
   b) contacting the surface with a composition comprising:
      i) an isocyanate in an amount up to about 75% by volume of the composition, the isocyanate being at least 75% aliphatic by weight; and
      ii) an amine in an amount up to about 75% by volume of the composition, the amine including between greater than 0% and about 40% by volume of an aliphatic primary amine and between about 40% and about 80% by volume of an aliphatic secondary amine;
   wherein the ratio of the isocyanate to the amine within the composition is between 1:3 and 3:1.

2. A process as in claim 1 wherein the isocyanate is present in the composition from about 30% to about 70% by volume and is at least 90% aliphatic by weight.

3. A process as in claim 1 wherein the isocyanate is present in the composition from about 40% to about 60% by volume and is at least 99% aliphatic by weight.

4. A process as in claim 1 wherein the isocyanate component includes less that 1% isocyanate monomer and is selected from the group consisting of dimerized, trimerized and biureted hexamethylene diisocyanate, a prepolymer thereof and mixtures thereof.

5. A process as in claim 1 wherein the amine includes at least 40% of an aspartic acid ester by weight.

6. A process as in claim 1 wherein the amine is maintained separate from the isocyanate until a time that is less than 60 seconds prior to contacting the composition with the substrate.

7. A process as in claim 1 wherein the composition is contacted with the substrate using an apparatus having a first metering container for receiving the amine a second metering container for receiving the isocyanate and a nozzle in fluid communication with the first and second containers for spraying the composition.

8. A process as in claim 1 further comprising adding into the composition a light stabilizer for assisting the coating in resisting degradation due to exposure to light.

9. A process as in claim 1 further comprising adding into the composition an effective amount of a metal salt for controlling static.

10. A process as in claim 1 further comprising adding into the composition a thixotropic agent.

11. A process for coating a surface of an automotive vehicle with a composition, comprising:
   a) providing a painted surface of a truck bed;
   b) providing at a temperature of no greater than about 90° C. an isocyanate component in an amount up to about 75% by volume of the composition, the isocyanate component being at least 75% aliphatic by weight;
   c) providing at a temperature of no greater than about 90° C. an amine component in an amount up to about 75% by volume of the composition, the amine component including between greater than 0% and about 40% by volume of an aliphatic primary amine and between about 40% and about 80% by volume of an aliphatic secondary amine;

d) intermixing the isocyanate component and the amine component to form an admixture of the components;

e) spraying the admixture onto the truck bed; and f) curing the admixture at about room temperature;

wherein the ratio of the isocyanate to the amine within the composition is between 1:3 and 3:1.

12. A process as in claim 11 wherein the isocyanate component is present in the composition from about 30% to about 70% by volume and is at least 90% aliphatic by weight.

13. A process as in claim 11 wherein the isocyanate component is present in the composition from about 40% to about 60% by volume and is at least 99% aliphatic by weight.

14. A process as in claim 11 wherein at least a portion of the isocyanate component is selected from the group consisting of dicyclohexylmethane 4,4'-diisocyanate, isophorone diisocyanate, tetramethyl-1,3-xylylene diisocyanate, hexamethylene diisocyanate.

15. A process as in claim 11 wherein the amine component includes at least 65% aspartic acid ester by weight.

16. A process as in claim 11 wherein the amine component is maintained separate from the isocyanate component until no greater than 60 seconds prior to contacting the composition with the substrate.

17. A process as in claim 16 wherein the composition is contacted with the substrate using an apparatus having a first metering container for receiving the amine component, a second metering container for receiving the isocyanate component and a nozzle in fluid communication with the first and second containers for spraying the resulting composition.

18. A process as in claim 11 further comprising adding into the admixture a light stabilizer for assisting the coating in resisting degradation due to exposure to light.

19. A process as in claim 11 further comprising adding into the admixture an effective amount of a potassium salt for controlling static.

20. A process for coating a surface of an automotive vehicle with a composition, comprising:

a) providing a painted surface of a truck bed;

b) providing at a temperature of no greater than about 90° C. an isocyanate component in an amount up to about 75% by volume of the composition, the isocyanate component being at least 75% aliphatic by weight;

c) providing at a temperature of no greater than about 90° C. an amine component in an amount up to about 75% by volume of the composition, the amine component being at least partially an aspartic ester of polyoxyalkyleneamine having a mole ratio of amine functionality to the ester of no more than 1:1;

d) providing an effective amount of a metal salt for controlling static;

e) providing a thixotropic agent;

f) intermixing the isocyanate component and the amine component, the metal salt and the thixotropic agent to form an admixture of the components wherein the admixture is substantially free of any catalysts;

g) spraying the admixture onto the truck bed; and h) curing the admixture at about room temperature.

21. A process as in claim 1 wherein the isocyanate has a residual monomer level that is less than about 1% by weight for assisting in lowering any volatile emissions of the composition.

22. A process as in claim 1 wherein the isocyanate has a residual monomer level that is less than about 0.2% by weight for assisting in lowering any volatile emissions of the composition.

23. A process as in claim 11 wherein the isocyanate has a residual monomer level that is less than about 1% by weight for assisting in lowering any volatile emissions of the composition.

24. A process as in claim 11 wherein the isocyanate has a residual monomer level that is less than about 0.2% by weight for assisting in lowering any volatile emissions of the composition.

25. A process as in claim 11, further comprising adding into the admixture a thixotropic agent.

26. A process as in claim 1 further comprising adding into the composition a stannous catalyst wherein the stannous catalyst assists in catalyzing formation of a polyurethane linkage for enhancing bonding of the composition to the surface.

27. A process as in claim 11 further comprising adding into the admixture a stannous catalyst wherein the stannous catalyst assists in catalyzing formation of a polyurethane linkage for enhancing bonding of the composition to the surface.

28. A process as in claim 1 wherein the aliphatic primary amine includes one or more polyoxyalkyleneamines having a molecular weight greater than about 200 for assisting in lowering volatile emissions.

29. A process as in claim 28 wherein the aliphatic secondary amine includes one or more aspartic esters having a molecular weight greater than about 190 for assisting in lowering volatile emissions.

30. A process as in claim 11 wherein the aliphatic primary amine includes one or more polyoxyalkyleneamines having a molecular weight greater than about 200 for assisting in lowering volatile emissions.

31. A process as in claim 30 wherein the aliphatic secondary amine includes one or more aspartic esters having a molecular weight greater than about 190 for assisting in lowering volatile emissions.

* * * * *